United States Patent [19]

Orso

[11] 4,289,538
[45] Sep. 15, 1981

[54] SEALING GLASS-CERAMIC ARTICLES

[75] Inventor: Francis L. Orso, Corning, N.Y.

[73] Assignee: Corning Glass Works, Corning, N.Y.

[21] Appl. No.: 942,072

[22] Filed: Sep. 13, 1978

[51] Int. Cl.$^3$ .............................................. C09K 3/10
[52] U.S. Cl. ............................. 106/286.5; 106/286.1; 106/286.7; 106/286.8; 106/287.26; 106/287.34; 252/512; 75/252; 501/7
[58] Field of Search ... 428/433; 106/39.6, 286.1–286.8, 106/287.26, 287.34; 252/512, 63, 64

[56] References Cited

U.S. PATENT DOCUMENTS

| | | | |
|---|---|---|---|
| 2,971,853 | 2/1961 | Stookey | 106/52 |
| 3,577,355 | 5/1971 | Blum | 252/512 |
| 3,951,669 | 4/1976 | Malmendier | 106/39.6 |
| 4,105,826 | 8/1978 | Thomas | 428/433 |

FOREIGN PATENT DOCUMENTS 1151648  5/1969  United Kingdom.

OTHER PUBLICATIONS

Chem. Abst. 84:34,653q.

*Primary Examiner*—Allan Lieberman
*Attorney, Agent, or Firm*—Richard N. Wardell

[57] ABSTRACT

The method of providing a mechanically strong, hermetic seal, for sealing glass-ceramic articles particularly MACOR ® brand machinable glass-ceramics, which seal is capable of withstanding heating in a vacuum to a temperature of up to 900° C. without foaming. The forming of the seal comprises reacting from 0.5–3.0 wt.% antimony metal powder with a devitrifiable glass frit having a coefficient of thermal expansion compatible with the materials being sealed and a melting point of >930° C.

5 Claims, No Drawings

SEALING GLASS-CERAMIC ARTICLES

BACKGROUND OF THE INVENTION

In co-pending application Ser. No. 908,003, now U.S. Pat. No. 4,221,604 filed May 22, 1978, commonly assigned herewith, there is disclosed a method of forming mechanically strong hermetic seals by reacting antimony metal with glass frit. Glasses which were subdivided to form the frit of that invention were limited to those having softening points of less than 750° C.

Most known sealing glasses foam (reboil) when heated in a vacuum to near their softening points. The problem faced by the inventor herein was developing a seal which was not only mechanically strong and hermetic, but which would remain stable, without foaming, when reheated in a vacuum to a temperature of at least 860° C. The seal disclosed in copending U.S. application Ser. No. 908,003 now U.S. Pat. No. 4,221,604 cited above failed to meet the test of reheating in a vacuum to 800° C.

SUMMARY OF THE INVENTION

I have discovered a sealing mixture capable of hermetically sealing glass-ceramic articles which can withstand reheating in a vacuum to 900° C. without foaming. The seals of this invention, in addition, exhibit high dielectric and seal strengths.

The sealing mixture of this invention consists of a devitrifiable glass frit, antimony metal powder and a vehicle. The frit has a melting point greater than 930° C. and a coefficient of thermal expansion sufficiently compatible with the materials being sealed that, when combined with an effective amount of the antimony metal, the mixture will yield a seal characterized by a coefficient of thermal expansion matching those of the materials being sealed and stability when heated in a vaccum to a temperature of 900° C. In the desired practice of this invention, from 0.5 wt.%–3.0 wt.% antimony metal powder is intimately mixed with a devitrifiable glass frit and sufficient vehicle, of either organic or inorganic composition, to form the sealing mixture.

Suitable glasses for practicing this invention should, of course, comply with the rule of having matching coefficients of thermal expansion with the materials being sealed. The frit utilized should also have a melting point above 930° C. so as to flow at the sealing temperature. Examples of particularly suitable devitrifiable glasses are the semicrystallizable glasses disclosed in U.S. Pat. No. 2,971,853 to Stookey, incorporated herein by reference. These glasses have compositions consisting essentially by weight of 60–85% $SiO_2$, 5.5–15% $Li_2O$, 2–25% $Al_2O_3$, and proportions of a photosensitive metal selected from the group consisting of about 0.001–0.03% of gold computed as Au, about 0.001–0.3% of silver computed as AgCl, and about 0.001–1% copper computed as $Cu_2O$.

The process of forming the seal comprises: intimately mixing the devitrifiable glass frit having the requisite compatible coefficient of thermal expansion and a melting point of >930° C., or preferably about 950° C., with an effective amount of the antimony metal powder which, when reacted, will form a seal characterized by a coefficient of thermal expansion matching that of the materials being sealed and an ability to withstand vacuum heating to a temperature of 900° C.; adding thereto sufficient vehicle to provide a sealing mixture with viscosity to effect coating of the materials; applying the mixture to the surface of at least one of the materials being sealed and joining the material to effect a seal therebetween; and thereafter firing the joined materials to a temperature above the melting point of the frit and preferably from 950° C.–980° C. A firing temperature of from 950° C.–1000° C. is considered suitable for effecting the seal of this invention.

A preferred method of sealing the glass-ceramic articles or segments involved first preglazing at least one segment of the material being sealed with the sealing mixture, firing that segment to a temperature of about 950° C.–980° C., placing the preglazed segment in contact with the other segment being joined thereto, and refiring to between 950° C.–980° C. for sufficient time to complete the reaction and form the seal.

Preferable seals of this invention are formed when the amount of antimony metal is from 1–2 wt.% of the frit plus metal powder.

DETAILED DESCRIPTION OF THE INVENTION

The invention relates primarily to the development of a seal for sealing machinable glass-ceramic segments to serve as a dielectric break ring in a fusion test reactor. Machinable glass-ceramics which are particularly suitable for practicing this invention are disclosed in U.S. Pat. No. 3,689,293 incorporated herein by reference. These glass-ceramic articles are formed from glasses consisting essentially by weight, on the oxide basis, of from 25–60% $SiO_2$, 15–35% $R_2O_3$, wherein $R_2O_3$ consists of 3–15% $B_2O_3$ and 5–25% $Al_2O_3$, 2–20% $R_2O$, wherein $R_2O$ consists of 0–15% $Na_2O$, 0–15% $K_2O$, 0–15% $Rb_2O_3$ and 0–20% $Cs_2O$, 4–25% MgO+ 0–7% $Li_2O$, wherein the total MgO and $SiO_2$ consists of 6–25%, and 4–20% F. The attachment of strain relievers to the assembled break ring requires reheating the sealed ring in a vacuum to a temperature of at least 860° C. The seals of this invention are not only capable of withstanding a vacuum reheat to 900° C., but also exhibit high mechanical and dielectric strengths.

Fabrication of the seal comprises reacting from 0.5–3.0 wt.% antimony metal with a devitrifiable glass frit. The coefficient of thermal expansion of the frit should be compatible with the materials being sealed so that the seals formed will have an expansion matching that of the sealed materials. It was also found that glasses suitable for practicing the invention should have a melting point >930° C. in order for the glass to flow at the sealing temperature. Particularly suitable glasses for use in sealing the machinable glass-ceramic segments have deformation temperatures of about 950° C. and have compositions substantially the same as the semi-crystallizable glasses disclosed by Stookey in U.S. Pat. No. 2,971,853 briefly described above.

The sealing mixture is formed by intimately mixing, by any known means, an amount of antimony metal powder with glass frit, and adding thereto a vehicle of either organic or inorganic composition. Butyl alcohol (1-Butanol) was found particularly suitable for use and should be added in the amount necessary to give the desired consistency. One skilled in the art should appreciate that the amount of vehicle to be added will depend to a large extent on the coverage and thickness of the desired coating on the sealing surface.

Sealing is accomplished in the usual manner by applying the sealing mixture to at least one of the sealing segments to be joined, placing the materials in contact with each other, and thereafter firing the assembled materials to a temperature above that of the melting point of the frit and generally from 950°–1000° C. to complete the reaction and form the seal. A preferable firing range is from 950° C.–980° C., since the deformation range of the glass-ceramics like those disclosed by Stookey in U.S. Pat. No. 2,971,853 can be from 1000° C.–1150° C. It was found that increased crystallinity of the seal can be achieved by increasing the hold time during firing or by firing at the higher temperature with shorter holds.

A preferred method of sealing the glass-ceramic segments is by a preglazing process which entails applying the sealing mixture to the clean surface of one segment of the material being sealed. The slurry (sealing mixture) should be allowed to air dry before firing the coated segment to a temperature of about 950°–980° C. for about 1 hour. Allowing the coated segment to dry prior to firing is desirable because it decreases the amount of liquid in the sealing coat, and thereby decreases the source of the air bubbles and voids which can form in the seal during firing as a result of the escaping gases formed by the liquid. The preglazed segment should be cooled prior to assembling and firing the assembled segments to a temperature of from 950°–1000° C. for about 2 hours. It was found that the preglazing of one segment with the sealing mixture appreciably reduces the amount of voids and bubbles present in the seal area. After the initial firing and cooling of the preglazed segment, the sealing material forming the glaze on the segment has a crowned contour with the high point at the center of the sealing surface. This crowning allows the sealing between the segments to begin at the center and progress to the edges as the seal flows outwardly during the subsequent firing. When large segments are being sealed, however, in a manner detailed above, the crowning will generally occur at the edges and therefore it will be necessary, in such instances, to grind down these high points prior to sealing to prevent trapped air pockets which can create large voids in the sealing area. Air bubbles trapped in the seal after the initial firing are therefore allowed to escape around the edges. The cooling rate is of importance where there is some likelihood of thermal expansion mismatch between the segments being sealed and the sealing composition which can cause cracking of the seal. This is especially true where the materials being sealed and the sealing material have high coefficients of thermal expansion as is present when sealing MACOR$^{TM}$ glass-ceramic segments which can have expansions of $85-100 \times 10^{-7}$ at 300° C. In such instances a fast cooling rate could cause cracks in the seal and/or leave residual stresses in the sealing area. A cooling rate of less than 100° C./hour is therefore recommended.

It is also recommended that a weight be applied to the materials being sealed during firing to help eliminate the trapped air bubbles in the sealing mixture which, as mentioned above, can form voids and small bubbles in the seal area. A weight of at least 0.5 lbs./in$^2$ ($\sim$0.035 kg/cm$^2$) is recommended. The applied weight also allows for sealing at a lower temperature because it results in a more expeditious removal of trapped air from the sealing mixture due to the increase force on the seal from the applied weight.

Although the particle size of the glass frit and antimony metal powder utilized to form the sealing composition is not critical for the practice of this invention, finely divided particles of >300 microns are more desirable than coarser, particles, which would tend to increase the amount of voids and bubbles in the formed seal, and which would also prevent the optimum particulate mixing of the sealing composition.

The following examples are given as illustrations of the invention and should not be construed as limiting the disclosed invention.

EXAMPLE I

Two clean machinable glass-ceramic segments, Corning's Code 9658, having dimensions of $\frac{1}{2}'' \times 3'' \times 7''$ and compositions by weight, on the oxide basis, of 46.2% $SiO_2$, 8.5% $B_2O_3$, 16.6% $Al_2O_3$, 6.7% MgO, 12.5% $Mg_2F$, and 9.5% $K_2O$ were sealed in a manner disclosed herein. The sealing composition was prepared by combining 20 grams of glass frit ($-200$ Tyler mesh) having a composition consisting essentially in weight precent of 79.2% $SiO_2$, 4.27% $Al_2O_3$, 9.28% $Li_2O$, 1.60% $Na_2O$, 4.13% $K_2O$, 1.01% ZnO, 0.38% $Sb_2O_3$, 0.012% Ag and 0.001% Au with 0.4 grams of antimony metal powder of $\sim$60 mesh (Tyler) particle size. To this is added about 6.2 grams of butyl alcohol to serve as the vehicle. After thoroughly mixing the sealing mixture utilizing a mortar and pestle, the slurry formed is poured onto the sealing surface of one of the cleaned glass-ceramic segments, distributed over the entire $\frac{1}{2}'' \times 7''$ surface with a spatula, and allowed to air dry for about $\frac{1}{2}$ hour. The coated segment is then fired to 950° C. for 1 hour at a 300° C./hour rate and cooled at 80° C./hour to 100° C. Thereafter, both segments are assembled together, then fired, with an applied load placed thereon of about 1.5 lbs/in$^2$ (0.1 kg/cm$^2$), at the rate of 300° C./hour to 980° C. for 2 hours and cooled at 80° C./hour to 50° C. This method of sealing produced seals which were essentially void-free, crack-free and hermetic, with seal strengths of over 7,000 lbs/in$^2$ ($\sim$492 kg/cm$^2$), and the seal was found to be unaffected when reheated in a vacuum to 895° C.

EXAMPLE II

Sealing mixtures containing 1 wt.% and 2 wt.% antimony were prepared in the same manner described above in Example I using the same glass frit composition. Instead of the preglazed method used above for fabricating the sealed samples, the sealing slurry was poured on clean $2'' \times 2''$ machinable glass-ceramic surfaces. Glass-ceramic segments having similar dimensions were placed onto the slurry on the coated segments and fired at a rate of 300° C. to a temperature of 980° C. and held for 2 hours. A weight of 1 lb was placed on the samples during firing. Although some small void and bubbles were present in the seal area, the sealed samples were hermetic and were unaffected by a vacuum reheat of greater than 860° C.

EXAMPLE III

Because of the intended use of the seal compositions in sealing machinable glass-ceramic segments for use as a dielectric break ring-seal, samples $\frac{1}{4}'' \times 0.012''$ and $\frac{1}{4}'' \times 0.05''$ were prepared as described in Example I using a 2 wt.% antimony sealing mixture. The dielectric strength values obtained ranged from 18 to 4,500 volts/mil with an average of 2,900 volts/mil.

I claim:

1. A sealing mixture for forming a seal between glass-ceramic materials, which seal is to be mechanically and dielectrically strong, hermetic and stable without foaming when reheated in vacuum to temperature of 900° C, and which mixture consists of a devitrifiable glass frit having a melting point greater than 930° C., antimony metal powder and sufficient vehicle to provide a sealing mixture with viscosity to effect coating of the materials, the glass frit having a coefficient of thermal expansion sufficiently compatible with the materials being sealed and the antimony metal powder being combined with the frit in an effective amount such that, when reacted with the frit, they will yield a seal characterized by a coefficient of thermal expansion matching those of the materials being sealed and by stability without foaming when heated in a vacuum to a temperature of 900° C.

2. The sealing mixture of claim 1 wherein the amount of antimony metal powder is from 0.5 wt.%–3 wt.% of the glass frit plus metal powder.

3. The sealing mixture of claim 2 wherein the amount of antimony metal powder is preferably from 1–2 wt.% of the frit plus metal powder.

4. The sealing mixture of claim 1 wherein the glass frit melts at about 950° C.

5. The mixture of claim 1 wherein the frit consists essentially by weight of 60–85% $SiO_2$, 5.5–15% $Li_2O$, 2–25% $Al_2O_3$, and proportions of a photosensitive metal selected from the group consisting of about 0.001–0.03% of gold computed as Au, about 0.001–0.3% of silver computed as AgCl, and about 0.001–1% of copper computed as $Cu_2O$.

* * * * *